United States Patent
Bolen et al.

[11] 3,936,558
[45] Feb. 3, 1976

[54] FIBROUS BODIES AND METHOD AND APPARATUS FOR PRODUCING SAME

[75] Inventors: Gerhard N. Bolen; Sidney C. Dunbar, both of Granville; George E. Smock, Heath, all of Ohio

[73] Assignee: Owens-Corning Fiberglas Corporation, Toledo, Ohio

[22] Filed: May 3, 1974

[21] Appl. No.: 466,764

Related U.S. Application Data

[63] Continuation of Ser. No. 233,549, March 10, 1972, abandoned.

[52] U.S. Cl. ............... 428/212; 428/218; 428/285; 428/299; 428/301; 428/302
[51] Int. Cl.² ............................................. B32B 7/02
[58] Field of Search ............ 161/89, 148, 152, 156, 161/157, 158, 166

[56] References Cited
UNITED STATES PATENTS

| | | | |
|---|---|---|---|
| 2,734,841 | 2/1956 | Merriman | 161/157 |
| 3,476,635 | 11/1969 | Heh | 161/82 |
| 3,616,143 | 10/1971 | Langlois | 161/166 |
| 3,660,222 | 5/1972 | Fleming | 161/157 |

*Primary Examiner*—Marion E. McCamish
*Attorney, Agent, or Firm*—Carl G. Staelin; John W. Overman; Kenneth H. Wetmore

[57] ABSTRACT

There is disclosed herein in a preferred embodiment a fibrous body which includes at least two layers of strands of continuous filaments and binder particles in each layer. One of the layers has filaments of the strands therein at least partially dispersed to form a mesh size which entraps binder particles therein which have a mesh size larger than the mesh size of the dispersed filament layer, as well as smaller size particles lodged at intersections and crossovers. Another lever has strands which form a mesh size which do not necessarily entrap binder particles but may retain particles therein at interstices of strands. The fibrous body has a binder content in the dispersed filament layer which is larger per unit volume than the binder content in the other layer. There is also disclosed a method for producing a fibrous body having variable mesh sizes or characteristics by selectively filamentizing strands or a layer of strands already in place in a mat-like collection of strands. There is further disclosed a preferred method and apparatus for selectively distributing binder in a multi-layer mat-like mass to produce the novel product of this invention. In the preferred method the plurality of successive layers of continuous multi-filament strands are deposited on a collecting surface in a mat-like mass. Binder particles are distributed throughout the mat-like mass, the binder particles having a mesh size with respect to the mesh size of the layers which enable circulation of the binder particles throughout the mat-like mass. The strands in one of the layers are opened to separate the filaments of the strands from each other and change the mesh size of that layer to mechanically entrap binder particles therein. The excess binder particles are removed from the mat-like mass to provide a first layer with a higher percentage binder content than the remaining layer or layers in the mat-like mass.

7 Claims, 5 Drawing Figures

FIBROUS BODIES AND METHOD AND APPARATUS FOR PRODUCING SAME

This is a continuation of application Ser. No. 233,549, filed Mar. 10, 1972, now abandoned.

BACKGROUND OF THE INVENTION

This invention relates to fibrous bodies, to the manufacture of fibrous bodies, and to applying binders to fibrous products; and more particularly to methods of distributing binders in such products. More specifically, the invention relates to a process for bonding multi-filament strands in a body of desired form, in which the filaments are of fibrous glass and are gathered into strands immediately subsequent to the filament forming operation, the strands then being collected and arranged in a body.

Mats of fibrous glass, because of the inherent glass properties, especially those of strength and inertness, have many uses. They have been employed as filtering, acoustical and thermal insulating media. They also serve effectively for roofing sheets, nonwoven fibrics, and for reinforcing plastic products such as electrical grade laminates.

In some instances, the mats are composed of short fibers held together by a binder. In others the mats are bonded webs of chopped fibrous glass strands. Bundles or strands of continuous glass filaments have also been disposed in mat form. Strands of filaments have superior strength because of the continuous nature of the filaments and their concentrated linear association in strand form. Accordingly, fibrous glass strands are a most desirable constituent where strength is a prime consideration.

Various resinous materials including dispersions, emulsions, solutions, and dry granular powders have been applied to fibrous glass masses be bonding materials to give the finished products dimensional stability and strength. Such liquids or powdered resins have been added in various ways such as by wiping, spraying, submersion and dusting. Obtaining a desired distribution of binding material in the mat at a reasonable cost has posed a problem which has been approached in the prior art in a variety of different ways.

A commonly employed method has been to spray a water dispersion or suspension of the resinous material upon the fibrous glass immediately adjacent the fiber forming operation. This method provides a mat or other body, in which the fibers are massed, having fairly uniform binder distribution and good strength. However, an excessive amount of water is involved and it is necessary to drive off through heating a major portion of this water. The heating requires considerable time and is otherwise costly from a production standpoint.

The same problem of a high water content is faced when a liquid binder is applied by spraying or by dipping to a mat of chopped strands or continuous strands.

Another former method has been to submit the mat of fibers to a scattering of a powdered resinous material. This granular binder has been necessarily shaken down into the mat by vibration and later set by application of heat. In some instances it is necessary to tear the mat apart to mix the particles. The mates so treated tend to have poorly bonded areas tensile strength, and high ignition losses, indicating nonuniform distribution and an excessive binder component.

There has also been introduced to the art in U.S. Pat. No. 3,318,746, issued May 9, 1967, and in Canadian Pat. No. 756,563, issued Apr. 11, 1967, two methods for overcoming the high water content problem and obtaining substantially uniform distribution of the binder throughout the mat-like mass.

In U.S. Pat. No. 3,318,746, a liquid binder is first applied longitudinally to the individual filaments before they are gathered into strand form. The strands are then collected in a body of desired configuration such as a mat and the liquid binder in the body is dried in a graduated manner whereby the binder adjacent one surface is comparatively dry and the opposite surface is comparatively wet. A powdered binder is directed against the comparatively dry surface and toward the comparatively wet surface. The powdered binder is distributed and retained substantially uniformly through the body due to the increasing proportion of the binder being caught by the progressively wetter portions while the amount of binder decreases through the progressive retention of the binder particles as they pass through the drier portions of the body. Thus there is a substantially uniform distribution of binder in the mat without having an excessive amount of moisture retained in the mat which must be driven off when the binder is being cured.

In the Canadian Pat. No. 756,563, a mat of randomly oriented glass strands is formed on a foraminous conveyor. A water dispersion of solid resin particles is flowed through the mat on the foraminous conveyor to leave resin particles distributed throughout the mat. After the water dispersion of binder particles is passed through the mat, the conveyor passes over a suction box which sucks excess liquid from the conveyor and the mat. The mat, with the small amount of water left therein in the form of droplets, is passed through an oven to reduce the droplets in size and bring particles of resin in around the area of contact between the fibers to bridge the fibers at the point of contact. Again, a substantially uniform distribution of binder has been obtained without an excessive amount of water being left in the mat which must be driven of before the binder can be cured.

The above and other methods not mentioned herein are now being used to achieve substantially uniform distribution of binder throughout the entire fibrous body, but we have discovered that improved characteristics for certain applications can be achieved by selectively distributing binder throughout a mat-like mass of strands. The distribution is uniform in each of at least two different areas, but the binder percentage content or amount of binder solids of each area is different. Mats of fibrous bodies used, for example, as reinforcement in the manufacture of electrical grade laminates, perform better when there is a concentration of or a higher percentage binder content adjacent to at least one surface of a mat or mats used for reinforcement of the laminates.

The dielectric strength, dielectric constant, dielectric breakdown and arc resistance, and dissipation factors of an electrical grade laminate made from reinforcing mats are substantially improved over such laminates made from mats having a binder solids content which is uniform throughout the thickness thereof and which do not have one or more at least partially filamentized layers. Moreover, the distribution of binder and filamentization of strands as described improves the handleability, unrollability, and the strength of such mats.

These improvements have been obtained in the above-described product while still enabling a reduction of fifty percent in the amount of binder solids required to attain the improved properties.

None of the hereinbefore described methods or other known methods for applying binders to fibrous products will permit a high degree of controlled or selective distribution of binder in a mat-like mass to obtain one layer which has a higher percentage binder content than one or more other layers also included in the mat. We have discovered that a preferred method for making a mat having the desired improved characteristics includes the steps of manufacturing a multi-layer mat in which at least one of the layers has strands with a different number of filaments to provide a faster reopening capability than the other layer or layers in the mat. Even with the preferred method of manufacturing the mat, however, none of the known methods of binder distribution would selectively distribute the binder as desired.

Multi-layer strand mats by themselves are not new to the art, having been introduced, for example, in U.S. Pat. No. 3,442,751, issued May 6, 1969. However, there has been no appreciation of the improved characteristics that may be obtained in the product of this invention, nor any attempt to selectively distribute binder throughout the mat to obtain a higher percentage binder content in one or more of the layers of the multi-layer mats than is present in other layer.

It was futher discovered that it is possible to filamentize or open the strands in one layer, or less all the layers, of the multi-layer mat in place, preferably on a collection surface. This novel method of selectively filamentizing strands of a mat and the apparatus for carrying out the method is used to entrap or retain more binder particles in the resulting changed mesh size of a filamentized layer therefrom to provide a higher bond percentage binder content in that layer than in the remaining portion of the mat.

In a co-pending application Ser. No. 201,002, filed Nov. 22, 1971, and assigned to the same assignee as the present invention, there is disclosed a method for filamentizing or reopening the strands in the entire body of a mat-like mass or collection of strands to filamentize all of the strands in the body to provide a uniform dispersion of filaments to achieve a more uniform porosity and integrity throughout the entire mat. This process, however, distributes binder uniformly throughout the mat and does not consider a method for selectively distributing the binder in the mat to obtain a higher percentage binder content in individual layers thereof and the product does not provide the unique characteristics of the product disclosed herein.

Accordingly, it is an object of this invention to provide a new method and apparatus for producing a novel fibrous body which advantageously may have binder selectively distributed therein to obtain a higher percentage binder concentration in a predetermined portion of the mat.

It is another object of this invention to provide a new and improved method and apparatus for selectively distributing particles of a solid binder material throughout a mat of glass fibers.

Still another object of the invention is the provision of new and improved method and apparatus of applying resinous binder to mats in such a manner that the handleability of the mats will be improved over that of the prior art processing, in which the performance of an object reinforced by such a mat is improved over prior art products, and to use a smaller amount of binder to accomplish the above objectives than has been used heretofore.

It is still further object of this invention to provide improved fibrous bodies which enhance the physical, mechanical and electrical properties of a composite moled laminate or structure using the fibrous bodies for reinforcement, and to provide an improved laminate product and a novel process for making same.

Another object is the provision of an improved continuous process and apparatus for economically producing bodies of fibrous glass.

SUMMARY OF THE INVENTION

The above objects and the principles of the invention are illustrated and featured in a preferred apparatus for continuously producing fibrous bodies comprised of continuous glass strands. A mat-like mass of multi-filament strands is continuously provided in an unwoven form on a moving surface. The mat-like mass or the moving surface is flooded with a strand dispersing medium which may carry binder particles in suspension, a liquid binder as an emulsion, or both. The strand dispersing medium is flooded onto the mat-like mass by guiding the moving surface past a flooding medium supply station. If binder particles are carried by the medium they have a mesh size which enables distribution of the particles throughout the mat-like mass by the liquid carrier as the mat-like mass is flooded. Similarly, a liquid binder is distributed throughout the mat-like mass by the medium.

Binder is continuously added to the mat-like mass as it moves past the flooding suspension supply station at a rate to create stream flow in the same direction with and at substantially the same rate of movement as the mat-like mass on the moving surface. The mat-like mass is maintained in the flood stream for a soaking interval which is sufficient to enable the strand dispersing medium or phase of the flood liquid to substantially overcome the forces holding the filaments together in strand form.

The flooded surface and upper portion of the mat-like mass is impinged with a second supply of the strand dispersing medium at the end of the soaking interval to mechanically aid in dispersing the filaments in the upper portion of the mat-like mass. The mesh size of the upper portion of the mat-like mass is thus changed by increasing the number of interstices to enable retention or entrapment of binder particles in the upper portion of the mat-like mass. The increased number of interstices and surface areas resulting from partial or full filamentization provides more deposit areas for binder, so that more binder may be retained in the filamentized layer.

Excess binder, and liquid dispersant are removed from the mat-like mass after impingement of the upper surface thereof and before the filaments of the strands in the lower portion disperse to change the mash size of the lower portion to a value which would prevent or inhibit binder particle movement therethrough or would provide added surface area for deposition of binder thereon. This enables the upper portion to retain a greater percentage of binder particles than the lower portion of the mat-like mass.

The mat-like mass is preferably provided on the moving surface by successively depositing a plurality of layers of multi-filament strands on the moving surface.

The multi-filament strands in the uppermost layer of the preferred embodiment are advantageously formed in a manner which enables a more rapid reopening of the filaments in the strands, in response to contact with a strand dispersing medium. This more rapid reopening capability of the filaments in the strands in the uppermost layer insures more particle entrapment by or increased surface area in the uppermost layer while enabling binder to be removed from the lower portion of the mat-like mass before filamentization or reopening of the lower portion strands.

In the preferred embodiment of the invention the strands in the upper portion of the mat-like mass are formed with fewer filaments per strand than the strands in the lower portion of the mat-like mass to enable a more rapid reopening of the upper portion strands than the strands adjacent to the upper portion. Advantageously, more of the fewer filament strands per unit area are deposited in the upper portion of the mat-like mass adjacent the upper portion, thus forming more smaller interstices in the portion and a better binder retention capability.

The filaments are advantageously directly deposited on the collecting surface by attenuating filaments from molten streams of glass, applying a forming size to the filaments which may include a coupling agent (to enhance the bond between the glass filaments and the resin the fibrous mat may later be combined with), and gathering the filaments into a plurality of multi-filament glass fiber strands.

In the preferred embodiment the upper layer of the mat-like mass is formed from multi-filament strands having a first predetermined number of filaments in each strand while the mat-like mass below and adjacent to the upper layer is formed with multi-filament strands having about fifty percent more filaments per strand than the strands in the upper layer. The smaller strands have the capability of reopening more quickly in response to contact with the strand dispersing medium to enable a mesh size change to retain binder before the filaments of the larger strands of the lower layer disperse to inhibit passage of binder through the lower layer. It was also found advantageous in the preferred embodiment to provide approximately fifty percent more of the smaller strands per unit area in the upper layer, thus enabling the smaller strands to lie closer together to form smaller interstices to enhance the binder retention capability of the upper layer.

The suspension removal step advantageously includes positively forcing air through the mat-like mass at a pressure which reduces the moisture content of the mat-like mass to approximately the same weight as the filaments and strands in the mat-like mass, before the mat-like mass is passed through an oven to flow, set and cure the binder and integrate the mass into a substantially unitary body. It is also advantageous to prevent flow out through the edges of the mat-like mass during the flooding and extraction or removal steps to maintain a substantially uniform binder distribution horizontally, within the upper and lower portions of the mat-like mass, and to prevent strand and filament movement transversely in response to edge flow. Edge flow prevention is preferably accomplished by dimensionally controlling the width of the mat-like mass by providing spaced elements above the moving conveyor surface to limit the width of the mat and to channel flood stream flow with the mat.

In the preferred embodiment of the invention the combined binder-medium which in flooded onto the mat-like mass comprises a suspension of solid, resinous binder particles in a liquid strand dispersing phase, medium or carrier. Of the total weight of binder and dispersing medium, 95 to 99.9% by weight can be the liquid strand dispersing phase and 0.1 to 5% by weight can be the binder particles.

The liquid strand dispersing phase of the binder is cheifly composed of water. However another preferable component is any compound, such as a resin emulsion or liquid resin which is dispersible in water and will form a sticky, tacky or glue-like layer or film on the filaments or strands of the mat-like mass. This film helps hold the solid binder particles onto the filaments or strands. Polyester, phenolic, epoxy, vinyl acetate, urethane or other similar resins or emulsions can be used. Generally a resin is chosen to either match or be compatible with the resin the mat-like mass will be combined with to make a laminate or other product. This layer or film should be tacky enough to retain at least 80% of the solid resin particles coming in contact with it after excess binder has been drained off. Below 80% retention the mat-like mass may have too many loose unbonded filaments or strands and present a fuzzy surface. In some product applications, for example, electrical laminates or pultruded shapes such as channels, this could be highly undesirable.

Other components of a preferred liquid strand dispersing phase are generally a catalyst and a coupling agent. If a resin or resin emulsion is used the catalyst promotes cure (polymerization) of the resin or resin emulsion of dispersion in the curing oven. The coupling agent serves to enhance the chemical bonding of the strands and filaments to the laminating or other type of resin later combined with the mat-like mass.

By weight of the solids content of the entire preferred liquid phase of the binder, the catalyst will comprise about 0.5 to 2% and the coupling agent about 20 to 50% and the resin about 50 to 80%. By weight of the total liquid phase, the total solids content should be about 0.1 to 3% and preferably about 0.25%.

The solid resin particles which are suspended in the liquid phase bond the filaments strands to one another after they are heated in an oven thereby caused to melt, flow around the filaments and strands, and then set. This is the case if the particles are made of a thermosetting resin. If a thermoplastic resin is used the particles would set outside the heated oven.

The binder particles can be held in the mat-like mass (prior to melting and flowing to bond the fibers) by being (a) lodged at filament or strand crossover points, or (b) entrapped in one or more layers of the mat-like mass where the filaments have been dispersed, or (c) held to filaments or strands by the tacky film formed on the filaments and strands.

In situations where only a small amount of binder particles are desired in layers of the mat-like mass which do not have dispersed filaments, a number of different approaches could individually or in combination be used. Only binder particles of a size that would be entrapped by the dispersed filaments could be used. Or the resin or resin emulsion that puts a tacky film on the filaments and strands could be left out of the liquid dispersing phase of the binder. This would cause far less binder particles to be held to the filaments or strands, both along their length and at crossover points.

It is also possible to vary the liquid resin or resin emulsion component of the binder formulation. For example if it is desired for some reason to have the filaments and strands solely or primarily bonded to one another by a liquid binder, a suitable liquid bonding resin could be mixed with the liquid dispersing phase. Suitable bonding resins could be those resins already mentioned as the resinous component of the liquid dispersing phase. In this instance the solids content of the liquid phase could the raised from the 0.1 to 3% by weight preferred range to 6 to 20% by weight of the total liquid phase. In this instance no binder particles or only those of a size that would be entrapped only or preferentially in the filamentized layer or layers of the mat would be used. Generally a liquid binder is not used in making mats which are used to reinforce laminates or the like. This is because the liquid bonding resin puts such a heavy coating on the filaments and strands that the laminating or other resin being reinforced by it hinders the laminating resin from bonding to the filament or strand surface.

To attain the best possible results with the mat-like mass made in accordance with this invention the solid binder particles should range in size from about 35 to 420 microns in diameter. This micron range corresponds to 40 to 400 mesh (U.S. Sieve Series).

The liquid strand dispersing phase of the binder can serve at least three functions. First, it can form a tacky, sticky or glue-like film on the filaments and strands to hold or retain the binder particles onto the filaments and strands; second, it can carry the binder particles uniformly throughout the mat-like mass, and third, it can disperse the filaments of the strands in one of the layers of the mat-like mass.

In one embodiment of the invention good results were obtained when the filament diameters were approximately 68 to 70 hundred thousandths of an inch and about one-half of the binder particles were 150 microns in diameter or larger (150 to 520 microns) and the other half were smaller than 150 microns in diameter (35 to 149 microns). When using the binder particle size and the filament diameter size just described, a mat-like mass was produced which prior to soaking in the binder had openings between strands of about 177 microns or 80 mesh. Thus the binder particles smaller than 177 microns uniformly passed through or were caught in the mat-like mass. After soaking in the binder however and opening the filaments in the upper layer of the mat-like mass, the openings in the upper layer were reduced to about 150 microns or 100 mesh. This layer then caught more binder resin particles (those between 150 and 177 microns in diameter) and had a higher binder content than the other layer. A binder content of approximately five percent by weight was found in the upper portion, and approximately two and one-half precent by weight in the lower portion. The ratio of the precentage of the upper portion to the percentage of the lower portion of the mat-like mass was such that the entire mat-like mass has an overall binder content of about three and one-half percent by weight. However acceptable mats for electrical laminates or pultruded shapes can have from one-half to 10 percent by weight of binder.

In the preferred method the product may further be provided with a bottom-most layer in which the strands include fewer filaments per strand than the strands in a layer which is adjacent to the upper layer and intermediate the upper bottom layers. The bottom layer also preferably includes more strands per unit area than the intermediate layer. When the product is being used in an application where a resin matrix must rapidly gain entrance to the central body portion of the mat through one of the surfaces, then it is preferred that the bottom layer of strands not be filamentized so that the matrix may be more easily admitted to the mat. However, the provision of more interstices does retain more binder during the extraction of excess binder therethrough to increase the surface binder content to improve handleability of the mat. For other applications, when an additional bottom layer is utilized, the flooding interval may be adjusted to overcome the forces holding the lower layer filaments together in strand form sufficiently to enable a dispersion of lower layer filaments in a manner to be described hereinafter. Whichever method is used, there by be provided a mat-like mass having upper and lower layers with higher percentage binder contents than an intermediate layer.

There is further disclosed herein an improved method of manufacturing an electrical grade laminate by preparing a fibrous mat so that at least one outer face layer of strands of continuous filaments has a higher percentage binder content than an adjacent inner layer of continuous filament strands. If more than one of the fibrous mats are used, they are positioned back-to-back so that the higher binder content layers of each mat face outwardly. The mats are impregnated with a resin matrix and are cured with pressure and heat to provide a solid laminate having improved punchability, dielectric strength, dielectric constant, dielectric breakdown and arc resistance, and dissipation factor. In a preferred embodiment the curing step included placing the impregnated mats under 500 pounds per square inch of pressure with stops inserted to hold the press apart to achieve the desired thickness of the laminate, and holding the pressure for three minutes while maintaining the impregnated mats at 235°F. The pressure was removed from the mats and their temperature was held at 150°F. for one hour, and then the temperature was held at 200°F. for two hours.

Other objects, advantages, and features of this invention will become apparent when the following description is taken in conjunction with the accompanying drawings, in which:

DESCRIPTION OF THE PREFERRED EMBODIMENTS

Figure 1:
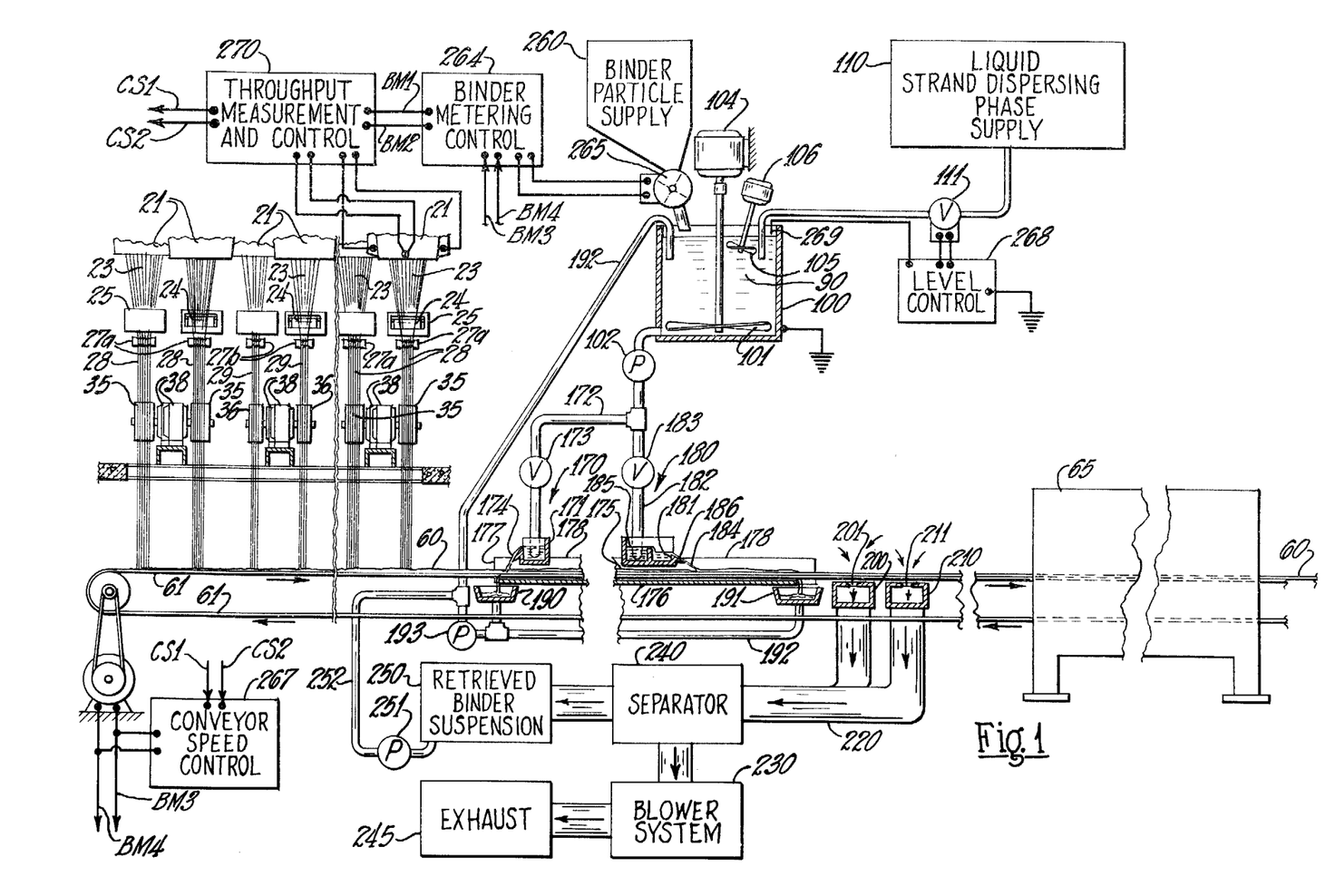
FIG. 1 is a side elevational view of a portion of a production line including equipment adapted for the practice of the invention.

Referring to the drawings in more detail, the fibrous mat production apparatus of FIG. 1 includes a portion of a series of molten glass feeding bushings 21, depending from conventional glass melting tanks which are not illustrated.

Continuous filaments 23 are drawn from the minute orifices of the bushings 21. For the purpose of being specific in describing the invention in connection with this apparatus, it will be considered that there are 438 orifices in each bushing and the filaments drawn therefrom have an average diameter of 68 to 70 hundred thousandths of an inch.

A forming size a applied to the filaments as they pass over carbon applicator rolls 24 of the conventional size applicators 25. If the fibrous mat is to be used as reinforcement in an electrical grade laminate, a preferred composition of the forming size is shown in the following Example 1.

EXAMPLE 1

| Ingredient | % by weight of total size |
| --- | --- |
| Weak Acid | 0.01 to 0.10 |
| Lubricant | 0.01 to 0.10 |
| Coupling Agent | 0.10 to 2.0 |
| Water | remainder |

The lubricant is added to allow a pull wheel to attenuate filaments from the busing without causing filament breakage. The lubricant used in the above size formulation may be chosen from pelargonic acid-tetraethylene pentamine condensate solubilized with acetic acid or caprylic acid-tetraetylene pentamine condensate solubilized with acetic acid. Generally polyethylene glycol-monooleates or monostearates are useful as lubricants. So also are fatty acid-amine derivatives.

The coupling agents used are generally organo silicon (silane) or chrome coupling agents. Those silane coupling agents that may be used in this size formulation are: gamma-methacryloxypropyltrimethoxysilane; gamma-aminopropyltrimethoxysilane; vinyl-tris(beta-methoxyethoxy) silane; and gamma-glycidoxypropyl-trimethoxysilane. Other coupling agents tailored to tthe laminating or matrix resin later combined with the mat could also be used.

A weak acid such as acetic acid, lactic acid, citric acid or formic acid is also preferably added to the size when some silane coupling agents are used to prevent the coupling agents from kicking out of the solution. The acid is used in a quantity sufficient to keep the pH of the size on the acid side. Generally amino silanes, such as gamma-aminopropyltrimethoxysilane, will remain in solution in an acid or basic solution.

Chrome coupling agents also may be used. These could be Werner complex compounds in which the carboxylato group coordinated with the trivalent nuclear chromium atom contains an amino group or an epoxy group.

EXAMPLE 2

A specific size formulation found to give good results when a polyester resin emulsion is used in the binder (as in Example 3) is as follows:

| Ingredient | % by weight of total size |
| --- | --- |
| Galacial Acetic Acid | 0.03 |
| pelargonic acid-tetraethylene pentamine condensate | 0.030 |
| caprylic acid-tetraethylene pentamine condensate | 0.01 |
| gamma-methacrylocypropyltrimethoxysilane | 0.20 |
| Water | remainder |

The pH is kept 4.0 to 4.5.

The filaments from each busing, after the forming size is applied thereto are grouped together to form a number of strands which are individually segregated as they travel within grooves over the respective gathering shoes 27a, 27b illustrated in FIG. 1. The primary division of the filaments into strand groups may be accomplished manually at the start of production.

The showing of six busing positions is representative of a twelve bushing production line apparatus to form the preferred embodiment of the product of this invention. The first two and the last two bushings of the series of twelve bushings deposit the bottom-most layers and top-most layers, respectively, of a mat 60 on collecting surface of a conveyor 61. The filaments of each of the first two and the last two bushing are preferably split or divided into twenty-two strands with approximately twenty filaments per strand. The filaments of each of the intermediate or middle eight bushings are preferably split into fourteen strands with twenty-nine to thirty-one filaments per strand.

The sets of strands 28 from the first two and the last two bushings in the series pass down around grooved guide or aligning shoes and idler wheels before being drawn over pulling wheels 35 and projected downwardly therefrom. Similarly, the sets of strands 29 from the remaining eight intermediate bushings reach pull wheels 36 and are projected therefrom. The pull wheels are driven by motors 38 arranged in pairs between adjacent pull wheels longitudinally of the production line.

The traction between the strands and the surface of a pull wheel furnishes the pulling force that attenuates the glass filaments formed from the minute molten glass streams issuing from the orifices of the furnace bushing. This adherence of the strands to the pull wheel is evidently due to the cohesive effect of the forming size carried by the strands supplemented by other air and surface forces of attraction.

The strands projected from the pull wheels are deposited upon the foraminous conveyor 61 and accumulate to form a continuous mat 60. The conveyor 61, or subsequent conveyors to which the mat 60 is tranferred, carries the mat 60 through a selective binder application area to an oven 65 curing of the binder components on the filaments and strands of the mat. The cured mat 60 issuing from the oven 65 may have its edges trimmed, be inspected and then packaged at a suitable packaging station if immediate use of the product is not desired.

The binder which is flooded onto the mat-like mass of this invention can comprise a suspension of solid, resinous binder particles in a liquid strand phase, medium or carrier. Of the total weight of binder, 95 to 99.9% weight can be the liquid strand dispersing phase and 0.1 to 5% weight can be the binder particles.

The liquid strand dispersing phase of the binder may be composed entirely of water. Another preferred component however is a resin or resin emulsion that is dispersible in water. Polyester, phenolic, epoxy, vinyl acetate or urethane resin emulsions can be used. Generally a water dispersible resin or resin emulsion is chosen that matches or is compatible with the resin that mat-like mass will be combined with to make a laminate or other product.

The resin emulsion can be any resin that will form a sticky, tacky or glue-like coating, layer or film on the filaments or strands of the mat-like mass. This film helps hold the solid binder particles onto the filaments or strands. This is especially important during the short period of time in the heated oven when the mat may have dried but the binder particles have not yet melted and begun to flow. The resin emulsion layer of film should be tacky enough to retain at least 80% of the solid resin particles coming in contact with it after excess has been drained off. Below 80% retention the mat-like mass may have too many loose or unbonded filaments or strands and present a fuzzy surface. In some product applications, for example, electrical laminates or pultruded shapes such as channels this could be highly undesirable.

Other components of the liquid strand dispersing phase are generally a catalyst and preferably a coupling agent. The catalyst is used to promote cure (polymerization) of the resin emulsion in the curing oven. The coupling agent serves to enhance the chemical bonding of the strands and filaments to the laminating or other type of resin later combined with the mat-like mass.

The solids content of the liquid phase of the binder can comprise about 0.5 to 2% catalyst, 20 to 50% coupling agent and about 50 to 80% resin. By weight of the total liquid phase, the total solids content can be about 0.1 to 20%. Preferably when making mats for electrical laminates the total solids content should be about 0.1 to 3% and specifically about 0.25%. A formulation for the liquid phase or medium of the binder is shown in Example 3.

EXAMPLE 3

| Ingredient | % by weight |
| --- | --- |
| Resin | |
| Diethylene glyco-fumarate polyester (70%) dissolved in diallyl phthalate (30%) | 0.30 |
| Catalyst | |
| Benzoyl peroxide (50% solids) in a butyl benzyl phthalate carrier | .0058 |
| Weak Acid | |
| Glacial Acetic Acid | 0.03 |
| Coupling Agent | |
| gamma-methacryloxypropyltrimethoxysilane | 0.1 |
| Water | remainder |

The resin component in the liquid phase of the binder may be any thermosetting or thermoplastic resin which will give the tacky or glue-like characteristics outlined above. Examples of resin components that can be used are polyvinyl acetate, vinyl toluene, diacetone acrylimide, epoxy, phenolic, melamine, acrylic and urethane resins, as well as the reaction products of propylene glycol and maleic or trimellitic anhydride. Generally in electrical mats polyester resins are used.

A catalyst is chosen which will promote cure (polymerization) of the liquid resin during or after passage of the mat through a heating oven. When ethylene glycol fumarate or diethylene glyco-fumarate is used as the liquid resin suitable catalysts are benzoyl peroxide, lauroyl peroxide, stannic chloride pentahydrate, cobalt nitrate and the like.

A weak acid such as acetic, lactic, citric or formic acid may be added to keep the pH of the liquid phase slightly acidic. This is only necessary when certain coupling agents are used in the formulation. Some coupling agents have a tendency to kick out of solution in a neutral or basic solutions, others do not.

The particular coupling agent used should be chosen to be reactive with the resin that will eventually be combined with the mat to make a product. In Example 3 the coupling agent used works well with polyester laminating resins. Other coupling agents which could be used are most silane or chrome coupling agents. Those listed in the discussion of size formulations can also be used.

It should be noted that at the filament forming station, the filaments receive a coating of the forming size containing silane or coupling agent which tends to cover the entire surface of the filaments. There may be an occasional skip or bare spot devoid of a layer of the coupling agent. For this reason, it is believed preferable to also include a coupling agent in the binder to insure a continuous coating of silane in those spots which might otherwise be bare or devoid of such material.

Also the binder coupling agent will coat the binder particles and again aid in the coupling of the matrix resin with the surfaces of the mat filaments and strands.

To attain the best possible results with the mat-like mass made in accordance with this invention the solid binder particles should range in size from about 35 to 420 microns in diameter. This micron range corresponds to 40 to 400 mesh (U.S. Sieve Series).

The binder particles circulated through the mat are both mechanically entrapped by the mesh size change in selected areas of the mat and also are attracted to and adhered to at least some of the filaments and strands inall areas of the mat, including particles that are lodged in the intersections or crossovers of strands or filaments in the portions of the mat which do not have a mesh size change. When these particles are heated in an oven they melt and flow around the strands or filaments they are in contact with or which are nearby and thereby bond these strands and filaments to one another. When the binder particles are powdered thermosetting resins they set up and cure in the heated oven. When the are thermoplastic they melt and flow in the oven but set up outside the oven at room temperature.

The binder particles should be of a chemical composition that is compatible with or the same as the resin later combined with the mat to make a product. Excellent results have been obtained by using particles of ethylene glyco-fumarate suspended in the liquid phase of Example 3 in the proportions shown in Example 4.

EXAMPLE 4

| Ingredient | Percent by Weight |
| --- | --- |
| Example 3 liquid phase | 99.85 |
| Ethylene glyco-fumarate particles (35 to 420 microns in diameter) | 0.15 |

Binder particles preferably should have jagged, non-spherical or irregular surfaces. Smooth or spherical particles can too easily slip through filament or strand crossover points. Irregularly shaped particles are more easily entrapped.

If the particles are thermosetting they should be able to melt, flow, set up and cure in a heated oven. It is of course important that the particles flow before setting up. Generally they should melt below 600°F. to be compatible with most mat making operations. If the particles are thermoplastic they would set up outside of the oven.

Figure 2:
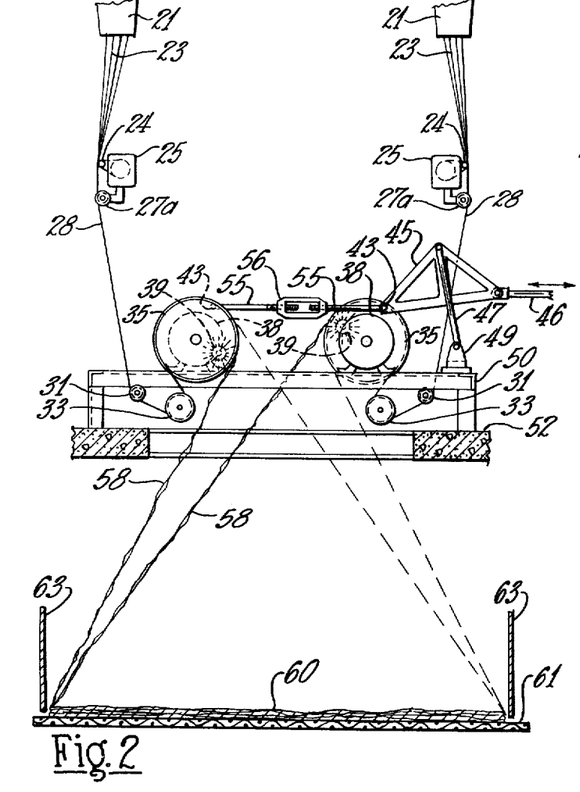
FIG. 2 is a somewhat enlarged vertical cross section of the production line of FIG. 1 showing two pull wheels and associated apparatus for gathering filaments into strands and projecting the strands upon a conveyor.
Figure 3:
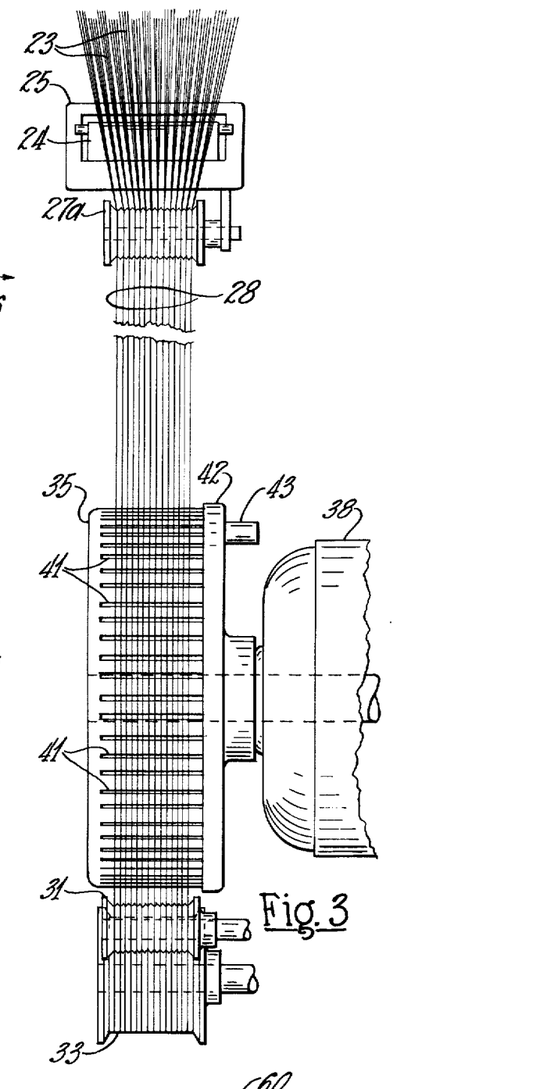
FIG. 3 is a further enlarged side view of one of the wheels of FIG. 2 receiving strands from a gathering shoe.
Figure 4:
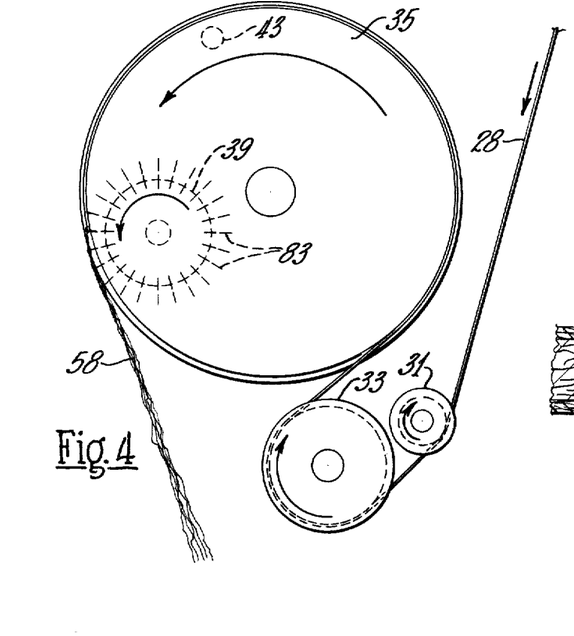
FIG. 4 is a front view on the same scale as FIG. 3, of the pulling wheel there shown.

In the vertical cross-section of FIG. 2 there is shown in elevation the first pair of bushings 21 of FIG. 1 and the apparatus associated therewith including the pull wheels 35 for depositing the strand on a conveyor. The pull wheels 35 with elements of the apparatus cooperating therewith are shown in enlarged form in FIGS. 3 and 4. As the wheels 35 and their associated apparatus are quite identical in structure and function, the description of the wheels 35 will generally apply to the apparatus including wheels 36 for the intermediate bushings.

From the guide or aligning shoe 31, which is grooved similar to the gathering shoe 27a for maintaining the strands separate and in spaced relation, the strands 28 are led around the idler wheel 33 and over and around pull wheel 35. The strands are released from the pull wheel at a moving point reciprocating along an arc of the peripheral path of the wheel. The release is effected by the successive projection of fingers 83 of the oscillating spoke wheel 39 located within the pull wheel 35, through slots 41 in the cylindrical surface of the wheel. The strands are thus kinetically projected downwardly tangentially from the wheel and in a path moving back and forth across the conveyor 61.

The rear side of each pull wheel is covered by an independently mounted, oscillatable back plate 42 (see FIG. 3) on which the associated spoke wheel is carried. Back plate 42 of the assembly including pull wheel 35 is arcuately oscillated through a rearwardly projection post 43. The latter is driven by functioning of a fluid cylinder or other mechanism (not illustrated) which acts through the triangular link 45, which pivots upon bar 47 mounted on the base 49 as shown in FIG. 2. The rod extending from the cylinder or other activating mechanism is joined to the triangular link 45 by linking rod 46. The base 49 is positioned on the platform 50 which also supports the other wheel 35, motors 38 and other equipment associated therewith. Platform 50 rests upon an operator floor 52.

Through the connecting assembly 55, including the turnbuckle 56, the transverse movement of the triangular link 45 is transmitted to a post 43 to also arcuately oscillate the back plate and spoke wheel 39 within the other pull wheel 35. With a single means effecting the oscillation of both spoke wheels their action may be closely synchronized.

The group of strands 58 thrown down by the pull wheels 35, 35, and the strands from the pull wheels following this pair are accumulated in mat form upon the traveling conveyor 61, which may be a carbon steel chain construction. Side shields 63 define the edges of the mat 60 and prevent undesirable lateral overreaching of the strands.

The width of the conveyor covered by the mat in the case may be varied through a wide range of changing the oscillating arc length of the spoke wheels and the distance of the pull wheels above the conveyor. The side shields 63 are adjustably mounted so that their spacing may be altered to match the desired width of the deposited material. For example, the width may be varied between limits of 14 inches to 84 inches.

The width of the pull wheels may be varied to accept a higher or a lower number of strands, the slots therethrough being made proportionately longer and the exterior portions of the fingers also made proportionately wider. The movement of the fingers 83 into the slots 81 and their momentary projection through the slots to release the strands is synchronized through a timing drive between the pull wheel and the spoke wheel. This may include a toothed pulley fixed upon the hub of the pull wheel, a cog timing belt running between this pulley and a pulley on a shaft upon which the spoke wheel is journaled.

The distance of the pull wheels above the conveyor, and the rotational speed of the wheels are so selected, in relation to the specifications of the strands being deposited, that the strands are projected with sufficient force to carry them as a band of generally constant form and in substantially regular paths to the surface of the conveyor or other collection surface. Each group of strands is thus deposited in a reciprocating strip across the conveyor in a constant repeating pattern and with substantially stable dimensions.

A large range of relationships can be established between the strips laid by various pull wheels in the system shown, but any one product may be reproduced uniformly by locking the system into the dynamic relationship which has been found to produce the particular mat construction desired.

Figure 5:
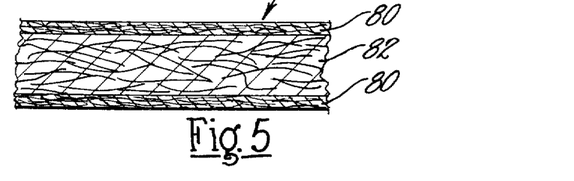
FIG. 5 is a section of a preferred embodiment of the fibrous body constructed according to the invention.

Referring to the sectional view of the mat produced as shown in FIG. 5 it can be seen that the mat 60 incorporates upper and lower surface layers 80 of light strands and a central body portion 82 of heavier strands. Since each bushing is supplying 438 filaments, the upper and lower layers 80 comprise two layers of 22 strands each from the first and second bushings and two layers of 22 strands each from the last two bushings in the series of twelve bushings. The intermediate body portion 82 includes eight layers of 14 strands each. As noted hereinbefore, the strands in the upper and lower surface layers 80 contain approximately 20 filaments per strand whereas the strands in the central body portion 82 contain 29 to 31, or approximately 50 percent more, filaments per strand. However, there are more strands per unit area in each of the surface layers 80 than in the central body portion 82. Thus, the smaller strands in the surface layers not only are able to lie more closely together to form smaller interstices because they are smaller in diameter, but there are more strands deposited per unit area so that a great many more interstices are formed than in the central body portion. This enables better particle entrapment capabilities when the mesh size of the surface layers 80, particularly the upper surface layer 80, is changed by the process to be hereinafter described.

As the mat 60 leaves the strand deposition position area, it is conducted through a binder application area. At a first liquid impingement or flooding station 170, a liquid suspension material 174 (preferably comprising solid binder particles suspended in a liquid strand dispersing medium) is distributed evenly across the mat-like collection of strands by a weir means 171. A supply line 172 supplies liquid to the weir means 171 from a suspension mixing tank or sump 100 via a pump 102. A valve 173 may be utilized to control the flow of the liquid suspension to the weir 171 and thus the amount of liquid impinging upon and flooding the strands in the mat-like mass 60. The liquid suspension 174 collects on a liquid retaining means, such as a plate 176, in a flood condition as noted at 175 to inundate the mat 60 completely.

An end 177 of the liquid retaining means 176 may be opened to enable the flow of excess suspension material 174 into a collecting trough 190 at the left side of the liquid retaining plate 176. Upwardly extending side walls or plates 178 are provided to prevent a flow transverse to the direction of travel of the mat and the stream formed by the flooded area 175. The side plates or walls 178 advantageously are spaced closely to the edges of the mats 60 to prevent flow of the suspension material 174 out through the edges of the mat. The prevention of edge flow will maintain the dimensional qualities of the mat and will prevent a nonuniform binder distribution in the edge areas. The side walls 178 may be extended past the termination of the plate 176, as noted at the right of plate 176 in FIG. 1, so that draining of the flood stream 175 from the mat 60 will occur only down through the mat rather than out through the edges thereof.

A flood stream flow will occur in the flooded area 175 if the liquid suspension is provided at a rate to flood the mat 60 completely and to move along therewith. A sufficient flow is advantageously provided by regulating the valve 173 so that the flooded area 175 will become a stream moving at substantially the same rate and in the same direction as the mat 60. The strands in the mat 60 will therefore not be disturbed from the orientation provided by the deposition apparatus. A second trough or catch basis 191 at the right of the liquid retaining plate 176 catches the flood stream 175 as it drains down through the mat 60 as the conveyor 61 and mat 60 pass the right end of the plate 176. Conduits 192 and the pump 193 cooperate to return the suspension materials collected in troughs 190 and 191 to the suspension mixing tank or sump 100.

The length of the liquid retaining plate 176 and thus the interval during which the mat is maintained in the flooded condition is determined in response to the speed that the mat is moving through the flooded area and the soaking time necessary for the strand dispersing medium in the suspension materials to overcome or substantially overcome the forces holding the filaments together in strand form. The soaking interval in the preferred embodiment is calculated or based upon the forces holding the smaller strands together that are lying in the upper surface of the mat 60 since, as will be noted hereinafter, the dispersion of the strands in the upper layer 60 is a critical factor in changing the mesh size to provide a higher binder percentage content in the upper surface layer.

With some strands it may be possible through soaking alone to disperse the strands in the upper layer before the strands disperse in the immediate or central body portion of the mat 82, depending upon the number of filaments in the strands and the relative treatments provided when the strands of the upper layer and central body portion are formed and deposited. But, the preferred and the most effective dispersal of filaments of the strands in the upper layer in the mat 60 may be accomplished by using a second liquid impingement station 180.

The second liquid impingement station 180 is spaced from the first impingement and flooding station 170 a distance, depending upon the speed of the conveyor 61, which is adapted to provide a predetermined soaking or bond weakening interval. The second impingement station includes a weir 181 supplied via a supply line 182, the amount supplied being controlled by a valve 183 connected between the pump 102 and the weir 181. If desired a second weir 185 may be interposed between the supply line 182 and the weir 181 to provide a double weir construction which will reduce turbulence when high flow rates are utilized. Apparatus for preventing or removing foam, such as bars placed across the surface of the liquid suspension in the weirs 185, 181, may be utilized to prevent flow of foam into the flooded upper surface of the mat 60 and an interference with the strand dispersing and binder distribution operation being performed. Similarly, foam prevention or removal apparatus may be used with the weir 171.

The control valve 183 in combination with the construction of the forward lip 186 of the weir 181 combine to provide a regulated, predetermined forward velocity of the impinging stream 184 with respect to the mat 60 and the flood stream 175. It is desirable to provide the impinging steam 184 with a slightly higher forward velocity vector than that of the flood stream 175 and the mat 60 for most effective strand dispersal in the upper layer.

A major portion of the excess suspension materials in the mat 60 is removed by gravity drainage from the mat 60 into the collecting trough 191 at the right of the liquid retaining plate 176 as the conveyor 61 and the mat 60 clear the end of the plate 176. Further excess liquid suspension materials are removed from the mat 60 by passing the foraminous conveyor over a plurality of suction chambers 200, 210, having suction slots 201, 211 formed in the upper side thereof. A blower system 230 connected to the suction chamber 200, 210 by a conduit 220 and via a separator unit 240 causes a reduced pressure in the chambers 200, 210 and a positive flow of air downwardly through the mat 60 to extract excess liquid suspension materials therefrom. The separator unit 240 separates liquid and particles that may be entrained in the air stream and diverts the suspension materials in the air stream to the retrived suspension storage tank 250. The cleaned air exits from the separator 240 through an exhaust system 245. A pump 251 and a conduit 262 returns the retrieved suspension materials to the suspension mixing tank 100.

The powdered binder or binder particles are added to the liquid carrier at a rate equal to the rate of deposition of the binder particles from the suspension onto the mat. This may be accomplished by sensing the throughput of the twelve bushings by a throughput measurement and control unit 270. The control unit 270 may provide a signal on leads BM1 and BM2 to a binder metering control unit 264 to regulate a binder feeding device 265 to control the amount of powdered binder put into the tank 100 from a particle binder supply 260 to maintain the percentage of binder particles supplied to weirs 171 and 181 substantially constant.

The throughput measurement performed by the unit 270 is accomplished by sensing the amount of heat supplied to the bushings 21 to maintain the molten glass therein at a desired attenuating temperature. If the amount of fibers being attenuated is greater, then the heat requirements are greater, and a measurement of the throughput of the bushings is obtained.

It is also desirable to control the line speed of the conveyor 61 so that a uniform mat thickness is collected thereon. This may be accomplished by providing signals on leads CS1 and CS2 from the throughput measurement unit 270 to a conveyor speed control 267. This signal may be the same as or proportional to the signal applied on leads BM1 and BM2, since the production of a greater amount of fibers should cause the conveyor speed to be greater to maintain a uniform thickness of mat collection.

Since the rate retention of binder particles by the mat-like collection will depend upon the rate of fiber production and/or the rate of movement of the collection, signals representing the line speed control 267 and applied to the binder metering control 264 via leads BM3 and BM4.

The dispersing medium 90 in tank 100 is constantly agitated by a stirrer 101 driven by a motor 104 to prevent the binder particles from settling out. In addition an agitator 105 driven by a motor 106 is placed adjacent the point of initial contact of the binder particles with the liquid to promote a fast wetting of the solid binder particles. The dispersing medium is provided from strand dispersing medium supply 110 via a valve 111 to the binder and agitation tank 100. To prevent settling out of the powdered binder or binder particles anywhere in the system, agitation is provided throughout the system by pumping large amounts of the liquid suspension from the tank 100 through the binder application area in the closed loop system shown so that a high rate of flow in all of the conduits and associated apparatus will prevent settling or separation.

The flow of suspension material from the supply 110 is regulated by a level control unit 268 which is responsive to the level in tank 100 as detected by a probe 269, to regulate the opening and closing of the valve 111. The unit 268 thus maintains a desired quantity or level in tank 100.

As described, the mixing and application system is of the closed loop nature so that all materials are completely and efficiently used. There is no loss as a result of drainage, spillage, inefficient application, powder fall-out, dry powder fall-through, or air currents.

In summary, the binder application area includes a flooding weir 170 for applying binder (solid binder particles in suspension) to the mat 60. The suspension stream 174 from the weir 171 preferably is flowed substantially vertically downwardly from the weir 171 to completely inundate the mat. The fluid suspension strikes with sufficient force to flatten out all mole hills, tunnels, and like irregularities which cause non-uniformities and which may have occurred in the deposition of the strands on the conveyor, but does not distrub the fiber orientation and does not affect mat uniformity. The no-load thickness of the mat is reduced by the flooding weir and the positive air flow therethrough during suspension extraction.

A soaking section is provided after the flooding weir 170 where the completely submerged mat is allowed to move with a pool of binder and strand dispersing medium at the same velocity so that all of the strands soak for a predetermined interval. The soaking interval may vary with the number of filaments in the strand, the type of forming size applied to the strand, and other conditions. With the specifications set forth hereinafter for a preferred embodiment of this invention, it has been found that a soaking interval of as little as seven seconds may be sufficient.

The purpose of the soaking section is to break down any bonds or other forces that may be holding filaments together in strand form in the layer or layers that are to be filamentized. The excess binder and strand dispersing medium flowing from both ends of the soaking section over the ends of the plate 176 is collected in the catch basins 190, 191 and sent back to the sump mixing tank 100.

A dispersing weir applies and impinges more binder and strand dispersing medium onto the top of the mat and the flood stream, after the soaking interval has expired. The fluid preferably flows from the weir 181 so that the horizontal vector of the impinging stream is substantially greater than the vertical vector thereof so that the impinging stream has a slightly higher velocity than that of the flood stream 175 and the mat 60 for most effective dispersing capability. The strands in the upper layer are therefore at least partially dispersed into their individual filaments to change the mesh size to a value which will mechanically entrap binder paticles in the upper portion or surface layers.

In the preferred embodiment of the method, apparatus, and of the product being formed, this is accomplished by the combination of providing strands in the upper layer which have fewer filaments per strand and thus are more readily reopened, and by providing more of the strands per unit area in the upper layer so that the interstices of the strands lie closer together. This combination encourages a rapid change in mesh size to retain or entrap the binder in the upper layer before a mesh size change occurs in the central body portion that would retain more binder therein or substantially inhibit the flow of the binder particles out of the central body portion. Some binder is of course, desirably retained in the central body portion of the mat, whether liquid and/or particulate binder, by surface tackiness of strands and filaments in the central body portion and the lodging of the particles at the crossovers or intersections of the large strands, even though there are fewer strands per unit area in the central body section.

Since the bottom layer is also composed of strands having fewer filaments per strand, and since there are more strands per unit area, the soaking interval and the contact with the strand dispersal medium may be adjusted to overcome the forces holding the filaments together in strand form before a similar reaction occurs in the central body portion. Then, as the water or dispersant is draining out of the mat 60 into the catch basin 191 through the bottom layer, it is believed that a hole seeking flow may occur through the smaller interstices of the bottom layer which will cause at least a partial dispersement of the filaments of the strands in the bottom layer by filaments being carried toward the holes by the flow. If a positive mechanical dispersing action is desired, an array of nozzles or a slit nozzle may be provided across the bottom of the plate 176 and connected to the sump 100 via a suitable flow regulator, to provide a flow which will impinge the lower surface of the mat 60 through the foraminous conveyor in the same fashion as the upper layer is dispersed. There may be thus created a mesh size change which may not, depending upon the number of filaments per strand and the forces holding the strands together, change the mesh size of the bottom layer as much as the mesh size of the top layer is changed. All of the binder particles therein or going therethrough because of the draining action may not be entrapped in the bottom layer.

Whether filamentized or not, the bottom layer at least provides substantially more intersections to filter some binder out of the draining flow from the central body portion and the bottom layer itself. Thus, there is a higher percentage binder content in the bottom layer than there is in the central body portion, although the binder content of the bottom layer may not be as high as that of the top layer. The higher binder content in the bottom layer will provide the mat with excellent surface properties and enhance the handleability of the mat.

It can be seen, then, that one of the major principles of the invention lies in circulating binder uniformly throughout a mat-like mass, and then selectively changing the binder retention capabilities of one or more areas in the mat to enable the areas having a changed retention capability to have a higher binder content than the remaining areas of the mat. This is most effectively accomplished by insuring at least a partial positive dispersal of the strands, as taught hereinbefore with respect to the top or upper layer of the mat 60.

Although discussed generally hereinbefore, it should be noted that the binder particle content in the strand dispersing medium may be substantially reduced and/or removed completely, while the liquid binder portion is substantially increased to obtain desired binder content concentrations. While there is no comparable mechanical entrapment of binder, the selective in-place filamentization of one or more layers after the liquid binder has been thoroughly and uniformly distributed throughout the mat will provide increased glass surface areas and intersections for receiving the liquid binder. Thus, the binder concentration will be higher in the filamentized layer or layers than in the remainder of the mat.

Because of the delicate nature of the control of the selective filamentization of a portion of the mat, it is preferred to provide relatively sharp distinctions between the binder retention capabilities of the layers wherein a binder concentration is desired and the other layers of the mat, as in the preferred embodiment disclosed herein, to reduce the responsibilities of the operators when the apparatus is on a production line. The product desired can then be obtained even though variations occur during the production in the deposition of strands in the application of forming size to the strands, in the diameters of the filaments and the strands, in the composition of the binder, and/or in the percent or type of binder particles suspended in the carrier.

However, the principles herein are applicable under controlled conditions without sharp distinctions being made between layers, particularly when a thicker mat is being produced. That is, the filamentization and mesh change desired in the upper portion of the mat may be accomplished by impinging a mat composed of strands, all having the same characteristics throughout the thickness of the mat, and designing the final impinging stream supply for filament dispersal so that only strands in the upper portion of the mat are affected and dispersed to change the mesh size thereof and to retain a higher concentration of binder particles therein. As noted hereinbefore, there would not be a sharp division between an upper portion or layer in this latter instance and the lower portion, since the degree of filamentization of the upper portion would gradually decrease from the upper surface downwardly as the effect of the impingement stream decreases, rather than having a relative sharp distinction between mesh size areas.

The binder application area also includes an extraction section which removes excess binder from the mat by first draining the liquid carrier and binder from the mat and then by passing air or other gas at a relatively high rate of flow through the mat for positive extraction. In the preferred embodiment of this invention the rate of flow of the air through the mat is controlled so that the binder or liquid suspension material left in the mat, as the mat enters the oven, weighs about the same as the strands and filaments in the mat. The preferred embodiment of the mat after curing has an overall binder content of about three and one-half percent by weight, as obtained from an average of five percent in the upper layer of the mat, about one and one-half to two percent in the central body portion, and between one and one-half and four percent in the lowermost surface of the mat. The binder and the air removed from the mat pass into a gas separator system where the gas is removed and exhausted to the atmosphere while the binder and dispersant is returned to the sump.

In the preferred embodiment the overall mat has approximately an 80 mesh porosity so that binder particles of 100 mesh size or higher will tend to circulate or be distributed freely throughout the mat of the mass. When the mesh size of the mat is changed, as by the application of the filament dispersing impingement stream 184 from the weir 181, the upper layer of the mat surface changes mesh size so that its porosity is at least 100 mesh thereby entrapping 100 mesh size particles in the upper layer.

An electrical grade laminate reinforced with mats having the surface with higher binder percentages facing outwardly provides the laminate with much better electrical characteristics. The higher binder particle concentration in conjunction with the finely dispersed filaments in the preferred embodiment apparently imparts higher or better dielectric strength to the surface of the laminate.

When using the novel product of this invention as a reinforcement for products the following improvements over other commercially used mats have been noted. The wet-through of the impregnating material is much faster. The forming press may be closed at a faster rate. No special pour pattern from the impregnating matrix is required. The higher porosity prevents dry spots or wash. The even horizontal binder distribution avoids the occurrence of soft edges. The wet-out by the impregnating matrix is better. There is less surface fiber prominence as a result of the finer strands. Heavily filled resins may be used. When the reinforced product is used as circuit mounting boards, the laminates have better punchability properties with less crazing and cracking in the circuit board surfaces and interior. The lower overall binder content, as compared to past reinforcing mats similarly used, enables the provision of more reinforcing glass fibers per unit area in the final product. The lower binder content and the coarser strands in the central body portion improve the moldability of the mat.

As noted hereinbefore the surfaces of the novel product are more tightly bonded to provide an improved handleability. Surface defects such as mole hills, puff balls or tunnels are substantially eliminated. The edge weight is more uniform. In addition, the compacting and elimination of surface defects and the other improved physical characteristics of the mat product enables a better thickness control of the product made when using the mat as a reinforcement, for example when a relatively thin electrical grade laminate is being formed. The standard powered binder application method of the prior art can be used on mats with a weight range of three-fourths of an ounce to 4 ounces per square foot. This invention will extend the range of mat weights possible down to one-eighth ounce and up to 6 ounces per square foot.

The prior art mats which are not filamentized on the surface tend to cause a cracking or crazing when the reinforced product is being punched. Other prior art mats which are completely filamentized have decreased porosity throughout the mat and present matrix wet-out problems in some applications. The present mat provides improved crazing resistance. This is believed due to higher binder concentration and greater filament dispersion at the surface being punched.

In prior art mats difficulties have been encountered sometimes with binder migration when the mat is being cured in an oven. In the preferred embodiment of this invention, the mechanical entrapment of the binder particles substantially reduces migration problems.

This improved mat may also be used advantageously in pultrusion applications. It processes better than other continuous and chopped strand mats in pultrusion applications due to better fiber bonding on mat surfaces and even compaction of the mat. It wets out and gives better laminate properties than chopped strand mats.

In conclusion, it is pointed out that while the illustrated examples constitute practical embodiments of our invention, we do not limit ourselves to the exact details shown, since modification of these details may be made without departing from the spirit and scope of this invention.

We claim:

1. A nonwoven mat having strands of continuous glass filaments generally disposed in irregularly shaped looping formation comprising at least two layers of the strands of continuous filaments, a portion of the strands of one of the layers being filamentized such that the filaments of those strands are separated from each other and binder material in each of the layers such that the one layer having strands that are filamentized contains more binder material than the other layer, the binder material in each layer being uniformly distributed in that layer.

2. A nonwoven fibrous mat having strands of continuous filaments generally disposed in irregularly shaped looping formation comprising:
   a. two contiguous layers of the strands of continuous filaments, one layer having the filaments of that layer more dispersed than the filaments in the other layer; and
   b. binder material joining the filaments into an integral mat where one layer contains more binder material than the other layer.

3. A fibrous mat as defined in claim 2 wherein a portion of the filaments in one layer intermingle with the filaments of the other layer such that the contiguous layers are interconnected.

4. A fibrous mat as defined in claim 2 wherein the layer which contains more binder material than the other layer is the layer having filaments that are more dispersed than the filaments in the other layer.

5. A fibrous mat as defined in claim 2 wherein the binder material in each layer is uniformly distributed in that layer.

6. A fibrous mat as defined in claim 2 wherein the strands of one layer contain more filaments than the strands of the other layer.

7. A fibrous mat as defined in claim 2 wherein the strands are formed of continuous glass filaments.

* * * * *